Feb. 15, 1966 A. P. ROGERS 3,235,257
SELECTIVE PIN DISTRIBUTOR
Filed March 6, 1963 5 Sheets-Sheet 1

Inventor:
Albert P. Rogers
By Hofgren, Wegner,
Allen, Stellman & McCord
Attorneys.

Feb. 15, 1966     A. P. ROGERS     3,235,257

SELECTIVE PIN DISTRIBUTOR

Filed March 6, 1963     5 Sheets-Sheet 3

Feb. 15, 1966 A. P. ROGERS 3,235,257
SELECTIVE PIN DISTRIBUTOR
Filed March 6, 1963 5 Sheets-Sheet 5

United States Patent Office 3,235,257
Patented Feb. 15, 1966

3,235,257
SELECTIVE PIN DISTRIBUTOR
Albert P. Rogers, Spring Lake, Mich., assignor to Brunswick Corporation, a corporation of Delaware
Filed Mar. 6, 1963, Ser. No. 263,269
5 Claims. (Cl. 273—43)

This invention relates to bowling pin handling apparatus, and particularly to a pin handling mechanism for use in an automatic pinsetter to enable the selective setting of less than the normal complement of ten pins for practice bowling, for example.

It is a general object of the invention to provide a new and improved pin handling apparatus of the type described.

Another object is to provide a new and improved pin handling apparatus of the type described, including an indexable pin receiving turret for delivering pins to a pin setting deck structure, conveyor means having a discharge end disposed to deliver pins successively to pin receiving pockets in the turret, means including a turret indexing cam and cam follower for operating the conveyor and the turret in timed relationship to fill the turret pockets, and selectively operable means for controlling the turret and the conveyor means to fill only preselected pockets in the turret less than the total number of turret pockets.

A more specific object is to provide a new and improved apparatus of the type described, including selectively insertable magnet members for insertion in positions of the turret indexing cam corresponding respectively to pin receiving pockets in the turret, for controlling operation of the conveyor means and turret to preselectively prevent delivery of pins to preselected turret pockets.

Still another object is to provide a new and useful apparatus of the type described which can be manually rendered inoperative during normal two-ball bowling to permit setting the normal complement of ten pins but which can be manually and readily rendered operative for setting preselected combinations of pins for practice bowling purposes, e.g., for bowling against preselected "spare" combinations, wherein the pinsetter automatically resets the same pin combination or alternatively, with manual reselection, can be rendered effective for setting a new combination of pins.

Yet another object is to provide a bowling pin handling apparatus which includes a pin conveyor and delivery means for feeding pins to an indexable pin receiver including a plurality of pin receptacles arranged to move successively past a pin receiving station in such a manner that pins are delivered only to preselected pin receptacles and the indexable receiver is otherwise maintained empty, and in which apparatus there is also included deck means disposed to receive the pins from the preselected receptacles and deliver the pins so received to a bowling alley and wherein indexing of the receiver and delivery of pins to at least some of the receptacles is determined by a cam surface and wherein the cam surface is selectively changeable in configuration by means of manually attachable magnetic portions for causing indexing of the receiver past the pin receiving station without receiving pins in one or more non-selected receptacles.

It is a further object to provide a bowling pin handling apparatus in accordance with the foregoing object including removable chute means for diverting a pin delivered to at least one pin receptacle in the indexable receiver.

A still further object of this invention is to provide a bowling pin handling apparatus in accordance with any of the foregoing objects wherein the peripheral nine pin positions of a normal triangular bowling pin setup are selectable by means of magnetic inserts adapted to be manually positioned on a turret indexing cam to change the cam surface at positions on the cam controlling delivery to the turret of pins which are not desired to be included in the triangular setup and wherein passage of the last pin delivered to the indexable turret is through the central or #5 pin receptacle, which receptacle is adapted to initiate the pin setting action of the pinsetter, and wherein releasably attachable chute means are provided below the point of initiation of the setting action and above the pin deck for diverting a pin passing through the central receptacle away from the pin deck where the #5 pin is to be excluded from the preselected setup.

Other objects and advantages will become readily apparent from the following detailed description taken in connection with the accompanying drawings, in which.

Figure 2:
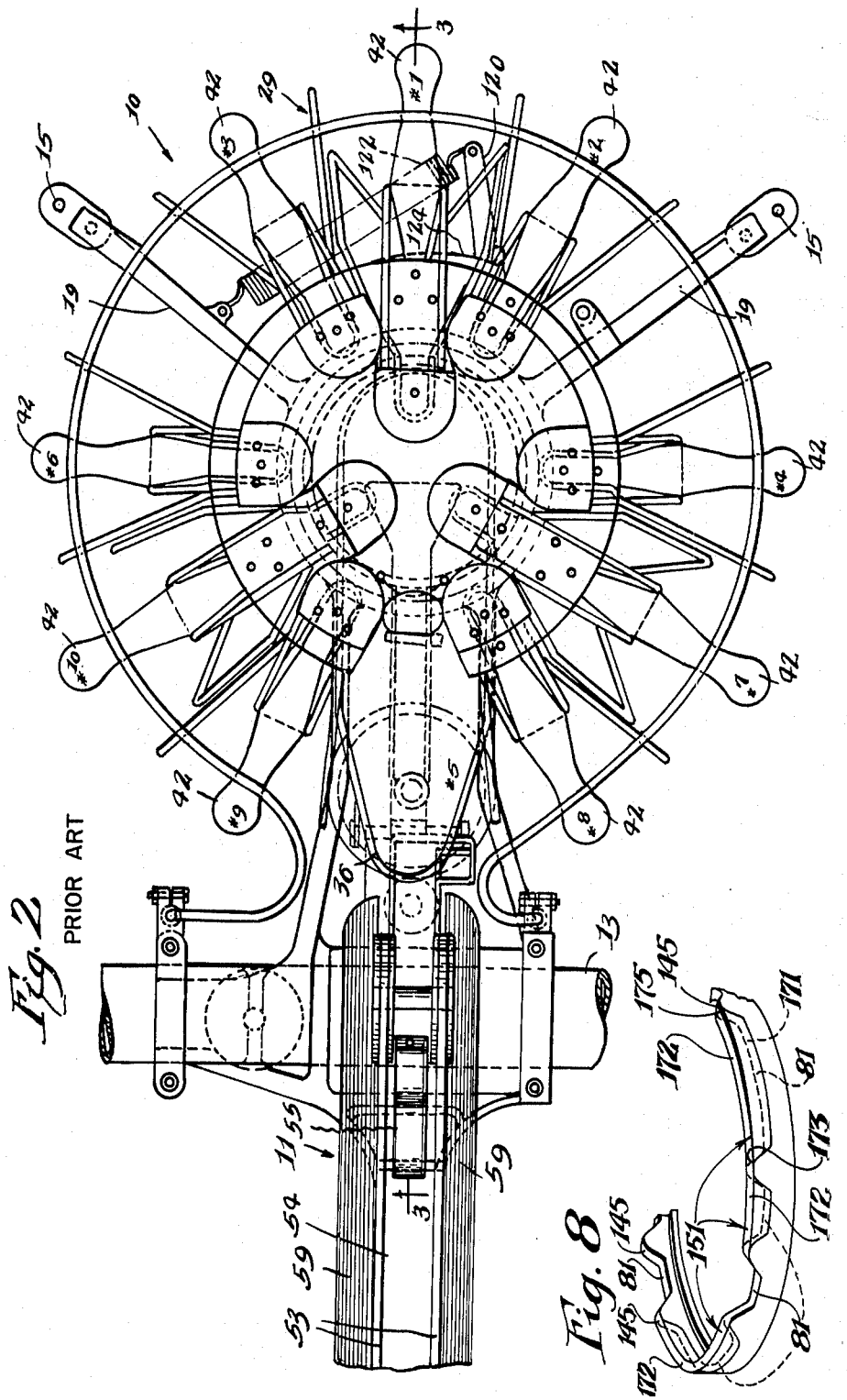
FIGURE 2 is a fragmentary plan view of a pin handling apparatus including cross conveyor and turret forming part of the pinsetter of FIGURE 1.
Figure 3:
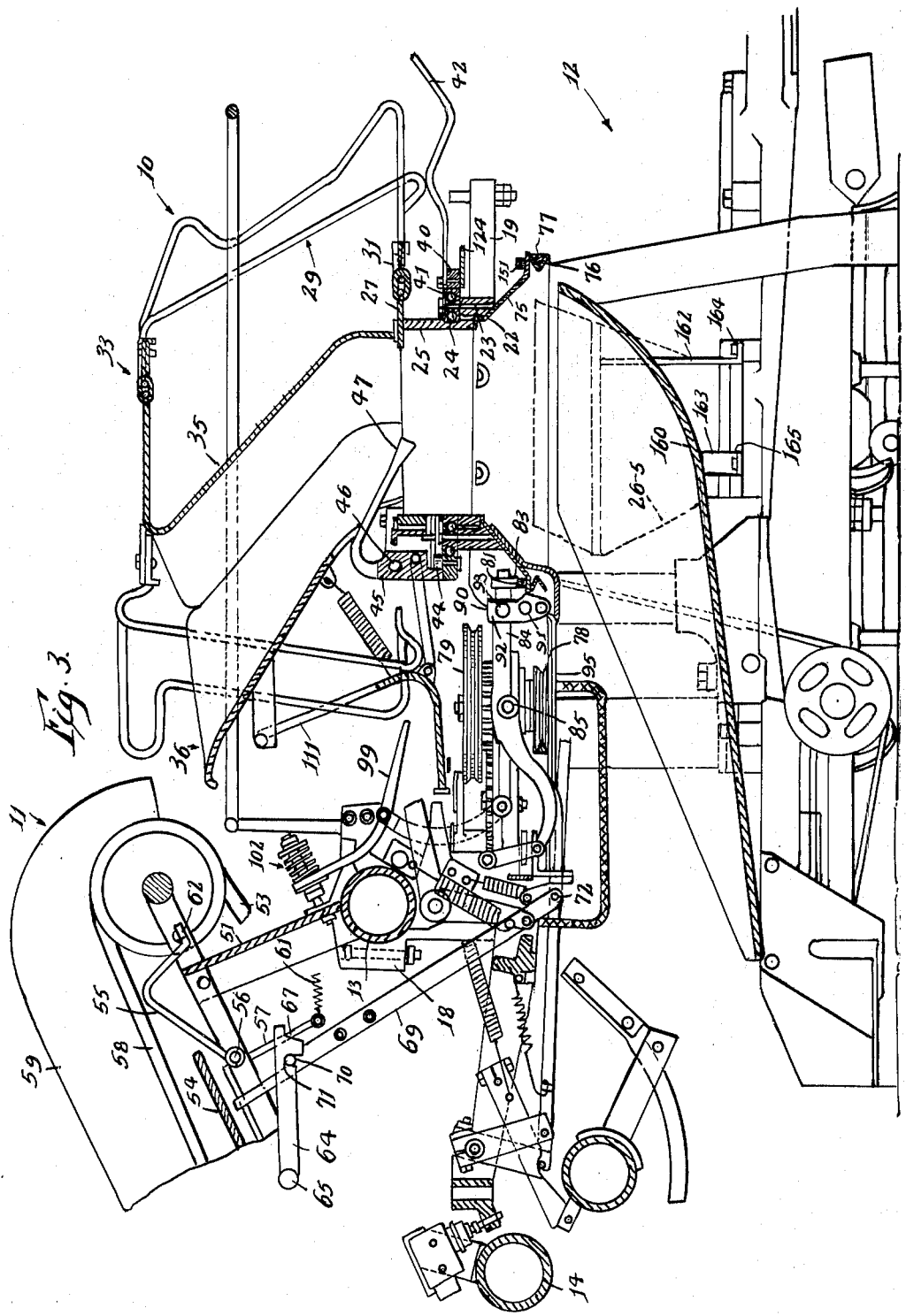
FIGURE 3 is a vertical sectional view taken at about the line 3—3 of FIGURE 2.
Figure 7:
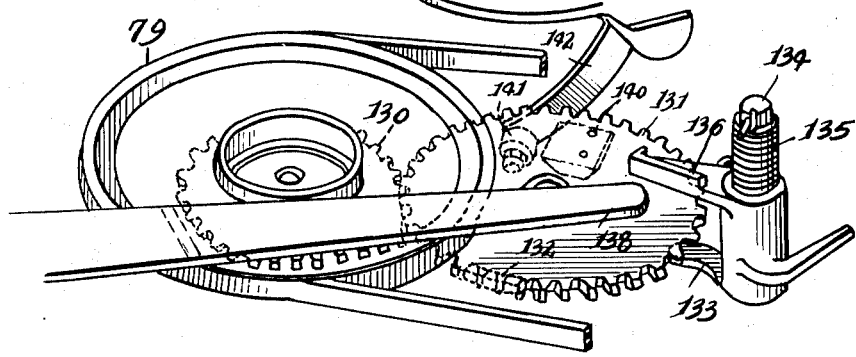

FIGURE 7 is a fragmentary, somewhat diagrammatic view taken from the rear of FIGURES 2 and 3, illustrating a mechanism controlling turret indexing after delivery of the last pin to the turret in conventional cycling; and FIGURE 8 is a perspective view of a turret indexing cam illustrating selectively insertable magnetic members for controlling the pinsetting operation in accordance with an embodiment hereof.

While an illustrative embodiment of the invention is shown in the drawings and will be described in detail herein, the invention is susceptible of embodiment in many different forms and it should be understood that the present disclosure is to be considered as an exemplification of the principles of the present invention and is not intended to limit the invention to the embodiment illustrated. The scope of the invention will be pointed out in the appended claims.

Referring now to the drawings in more detail, the invention is embodied in a pin handling mechanism adapted for use in an automatic pinsetter and including a turret structure generally designated 10 and a conveyor structure generally designated 11 arranged to deliver pins one at a time to the turret structure. The conveyor is adapted to receive pins from a pin gathering mechanism generally designated 9 for collecting pins in the pit at the end of a bowling alley, elevating the pins to the level of the receiving end of the conveyor and depositing the pins on the conveyor for travel serially with the butts of the pins leading. The turret structure is adapted to deliver as many as a full complement of ten pins to a pinsetting structure generally designated 12 for setting the pins initially in playing position on the alley, lifting standing pins after a first ball is rolled in order to permit removal of dead wood, and resetting such pins in playing position for the second ball. It is not intended that a complete automatic pinsetter is to be described and illustrated herein, but rather that reference should be made to such known pinsetter as that described and illustrated by Huck et al. in U.S. 2,949,300, patented August 16, 1960, as a pinsetter in which the apparatus herein described can conveniently be used.

The operating parts of the conveyor and turret structures may be supported in any suitable manner, and as illustrated herein are supported by means including a rigidly mounted tubular shaft as at 13 (FIGURES 2 and 3), a similar shaft as at 14 and hanger rods as at 15. Opposite ends of the shafts 13 and 14 may be suitably supported on kick-backs, and the hanger rods 15 may depend from a suitable superstructure also mounted on the kick-backs. In the preferred construction illustrated, a suitably shaped chassis or frame member 17 is supported by attachment to cross shaft 13 as at 18 and includes a pair of diverging arms as at 19 supported by the hanger rods 15.

Intermediate opposite ends of the frame member 17, it includes an annular support 22 on which is mounted a bearing member 23 having an inner race 24 rotatably supporting a tubular member 25 forming the hub of the indexable turret. An annular plate 27 is attached to the upper edge of the hub 25 as by screws 28, for supporting wire rods as at 29 providing nine outer pin receiving pockets spaced around the axis of turret rotation. Lower ends of the wire rods are secured to the plate 27 by means of clamps 31 and upper ends of the wire rods are held securely in position relative to each other by means of clamping plates as at 33. As will be understood on reference to FIGURE 2, the pin receiving pockets provided by the wire rod structure 29 are disposed in an annular series concentric around the axis of turret rotation and adapted to receive pins for each of the conventionally numbered pin positions except the #5 pin.

The turret includes a chute 35 for receiving the #5 pin. The lower end of such chute is positioned centrally of the turret and secured to the upper end of the hub member 25. The upper portion of the chute is inclined upwardly and toward the left, when the turret is positioned angularly as illustrated in FIGURES 2 and 3, and terminates at the upper end in a mouth or opening 36 for receiving the #5 pin.

The pin receiving pockets provided as described above are positioned on the indexable turret structure to move successively through a pin receiving station immediately beneath the discharge end of the conveyor structure 11 at the turret is indexed. In operation, the turret is indexed to position one of the receiving pockets at the pin receiving station, whereupon the conveyor delivers a pin to such pocket, after which the turret is again indexed to position the succeeding pocket at the pin receiving station. According to conventional procedure, these steps are repeated until such time as the turret is completely filled with a complement of ten pins.

Figure 6:
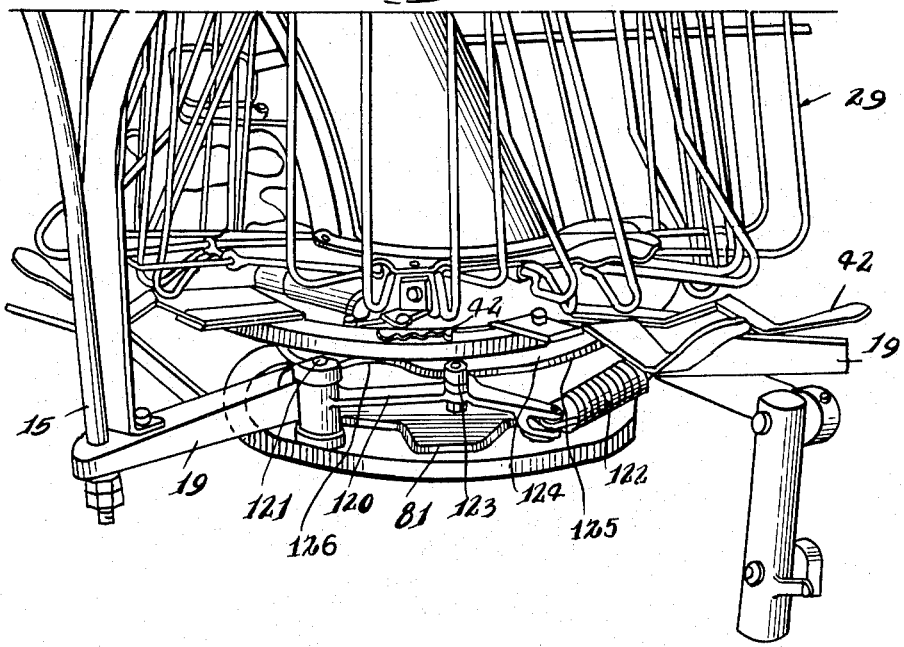
FIGURE 6 is a fragmentary perspective view taken from the front of FIGURE 2, illustrating a control for the pin supporting means in the turret.

In order to support the pins in the nine outer pin receiving pockets, a spider structure (see also FIGURE 6) is provided including an annular hub 40 rotatably mounted by means of an outer race 41 on the bearing 23. The hub 41 has nine outwardly projecting fingers or spoons 42 disposed respectively beneath the chutes or guides provided by the wire rods 29 to thereby form the bottoms of the pin receiving pockets. The spoons 42 thus support the pins in the nine outer pockets. While the spider is rotatably mounted for movement relative to the turret hub 25, it is normally latched to the hub 25 for rotation therewith as the turret is indexed. To this end, the spider hub 40 includes a latch roller 44 (FIGURES 3 and 5) adapted for engagement by a latch 45 pivotally mounted on the turret hub 25 as at 46. The latch member 45 carries a trip arm 47 projecting into the chute 35 and engageable by the tenth pin in the series delivered to the turret, for the #5 pin position, to pivot the latch to release the spider for rotation relative to the turret to thereby remove the pin support provided by the spoons 42 in order to release the pins to drop to the deck structure below the turret, as will be explained in more detail presently.

Figure 1:
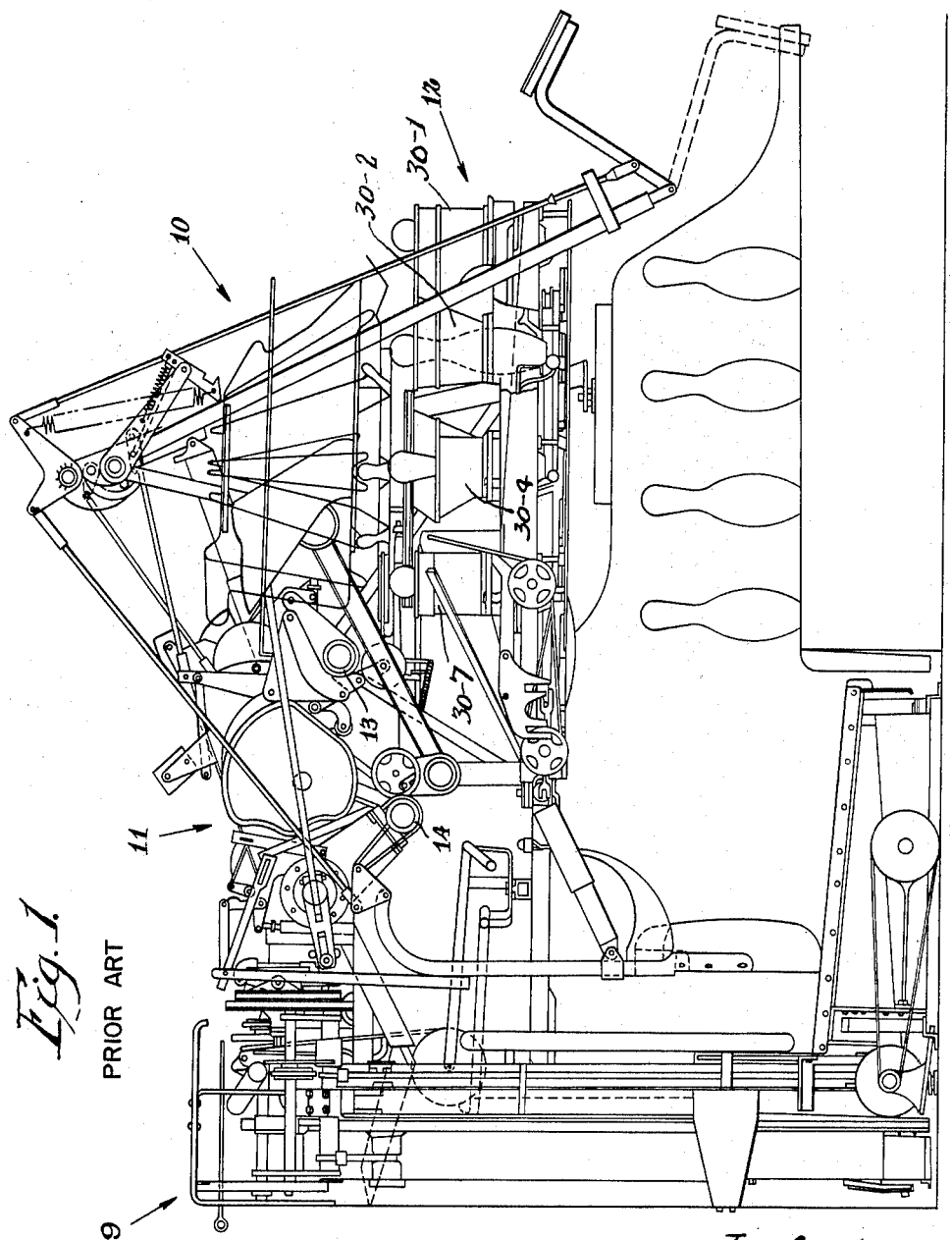
FIGURE 1 is a side elevation of an automatic pinsetter in which there may be incorporated a control embodying the principles of the present invention and a portion of the alley bed with which it cooperates, with parts broken away.

The conveyor means 11 includes a frame 50 preferably supported by a bracket 51 attached to the cross shaft 13 and the frame 50. The frame provides a support for a pair of parallel belt pulleys as at 52, on a common axis, and having a pair of belts 53 trained thereabout. Opposite ends of the belts 53 pass around drive pulleys adapted to be continuously driven, so that the belts 53 are continuously driven. The belts are spaced apart by a distance somewhat less than the diameter of a bowling pin at the belly of the pin, so that the large portion of the pin is adapted to rest on the belts, with the base leading, and with the head of the pin falling between the belts and resting on a plate as at 54. The upper reaches of the belts 53 are supported on and travel along edges as at 58 provided on side plates 59 suitably attached to the conveyor frame. The pins are delivered to the belts 53 by the pin elevator mechanism 9 (FIGURE 1) which gathers the pins in the pit of the alley and delivers them to the belt one at a time, for delivery to the turret structure in similar fashion, so that the pins fall base first into the pockets on the turret.

In order to control the delivery of pins from the cross conveyor to the turret, so that pins are delivered only one at a time to the turret and may be spaced in time so as to fall only into empty pin receiving pockets on the turret, a pin gate is provided at 55, pivotally mounted on the frame 50 as at 56 and including a lower arm 57 adapted to control the movement of the pin gate by virtue of an interlock with the turret operation, as will be explained presently.

Figures 4, 5:
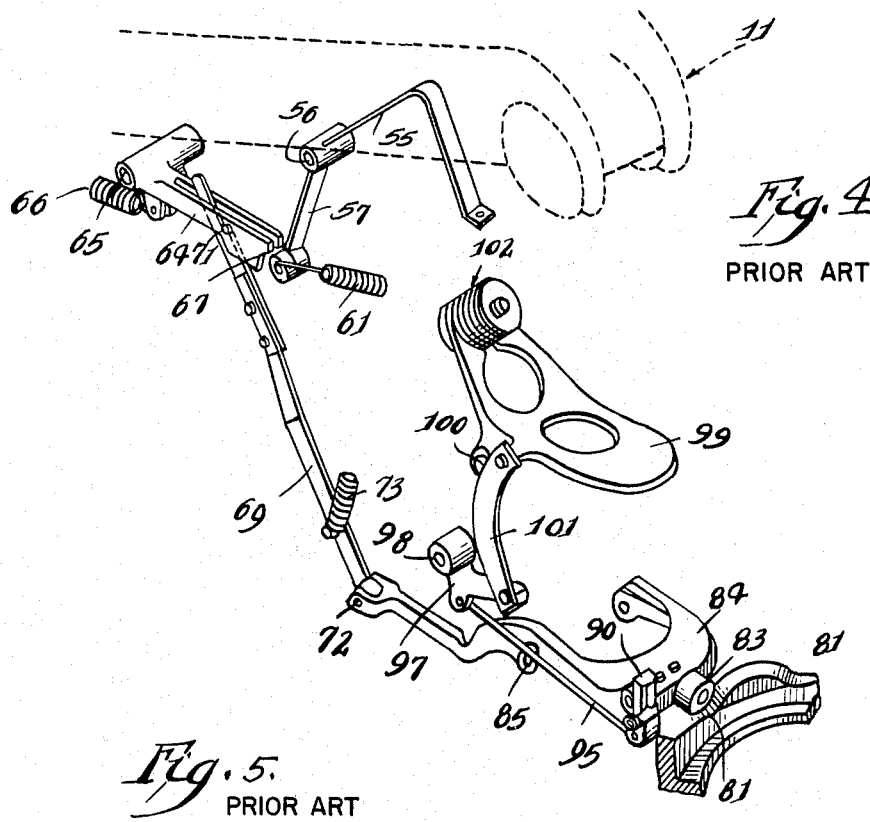
FIGURE 4 is a perspective, somewhat diagrammatic view, taken from the right front of FIGURE 3 illustrating a latch and trip mechanism for controlling turret indexing and for controlling the passage of pins from the conveyor to the turret.
FIGURE 5 is a perspective, somewhat diagrammatic view, taken from the left front of FIGURE 3, illustrating a latch and trip mechanism controlled by the passage of the last pin to the turret in conventional cycling of the apparatus.

In operation, the pin gate 55 is normally urged in a counter-clockwise direction by a return spring 61 secured to the end of the lower arm 57 and suitably anchored on the frame, so that an end portion 62 of the pin gate arm 55 abuts against the frame 50. The pin gate is normally latched in the position described by means of a pin gate latch 64 suitably pivoted on the framework as at 65 and biased in a clockwise direction by means of a spring 66 (FIG. 4). The latch 64 includes a recessed end portion as at 67 adapted to receive the lower end of the pin gate arm 57, preventing clockwise movement of the pin gate member. With the pin gate latched as described, a pin travelling along the continuously driven belts 53 will be stopped upon engagement with the pin gate arm 55. However, after the turret has indexed to position an empty pin receiving pocket at the pin receiving station beneath the discharge end of the conveyor, the pin gate latch 64 is released to allow clockwise movement of the pin gate under the urge of the pin engaged therewith, so that the pin is permitted to pass to the turret.

The latch 64 is normally held in a latching position by means of a latch spring 66 and is adapted to be released by a latch link 69 having a notch 70 adjacent the upper end thereof engageable with a pin 71 on the latch. The lower end of the link 69 is attached to a movable pivot as at 72, and the link is urged in a clockwise direction by spring 73 (FIG. 4) suitably anchored on the framework. After the turret is properly indexed to receive a pin from the cross conveyor, the link 69 is moved upwardly to engage pin 71 to thereby pivot the latch in a counterclockwise direction, releasing the lower pin gate arm 57 to permit pivotal movement of the pin gate in a clockwise direction and thereby facilitate passage of a pin along the conveyor.

In order to drive the turret through its indexing steps as it receives a complement of pins, the turret hub 25 is provided with a depending bell-shaped extension 75 formed at the lower end to provide a pulley 76 for receiving a belt 77 trained thereabout and trained about a drive pulley 78. The pulley 78 is interconnected with a driving pulley 79 adapted to be continuously driven by means not illustrated, so that the lower pulley 78 is continuously driven. So long as the turret is free to rotate, the drive described including the belt 77 is effective to turn the turret. However, when the turret is held against rotation, as when stopped to receive a pin, the pulley 78 slips relative to the belt 77.

Indexing movement of the turret under the continuous urge of the driving belt 77 is controlled by means of an indexing cam preferably formed on or atached to the bell-shaped extension 75 and provided with a series of upwardly facing recesses as at 81 (FIGURES 3, 4, and 8) angularly spaced about the axis of the turret at positions corresponding to the positions of the pin receiving pockets. The recesses 81 receive a stop roller 83 carried on the end of a stop lever 84 pivotally mounted on the frame as at 85 and interconnected with the pin gate latch release link 69 as at 72. While the stop roller 83 is held in one of the stop recesses 81, rotation of the turret is prevented, but when the stop lever and the stop roller are free to rise, the tendency of the turret to turn forces the stop roller upwardly, allowing turret rotation.

The stop lever 84 and the stop roller 83 are normally held in the depressed position illustrated in FIGURES 3 and 4 by a latch 90 pivoted at 91 and carrying a latch lug 92 engageable over a latch roller 93 on the stop lever 84. The latch 90 is normally maintained in the latching position illustrated, but may be pivoted in a clockwise direction by means of a latch release mechanism including a latch release link 95 having one end connected to the latch as at 96 and the opposite end connected to a lever 97 pivoted on the frame as at 98. The lever 97 includes an arm connected to a trip mechanism including a trip lever 99 pivoted on the frame as at 100 and connected by a link 101 to the lever 97. A spring mechanism 102 mounted on the bracket 51 urges the trip lever in a counter-clockwise direction, elevating the link 101, maintaining the lever 97 in an upper position and thereby maintaining the latch 90 in latching position.

The trip lever 99 is disposed to be engaged by each pin passing from the cross conveyor to the nine outwardly disposed pin receiving pockets on the turret. In this fashion, each pin delivered to one of the nine outer pockets on the turret pivots the trip lever downwardly in a clockwise direction, thereby pivoting the lever 97 also in a clockwise direction to retract the latch release link 95 and pivot the latch 90 in a clockwise direction to release the stop lever 85 to permit the turret to index to position the next pin receiving pocket at the pin receiving station.

As the turret indexes, the stop roller 83 is free to drop into the succeeding depression 81 it encounters and the latch is free to return to latching position so that the turret is stopped with the next pin receiving pocket positioned at the pin receiving station.

Operation of the pin gate 55 on the cross conveyor is interlocked with operation of the turret by virtue of the connection at 72 of the pin gate latch release link 69 with the stop lever 84. As best illustrated in FIGURE 4, when the stop lever 84 is pivoted in a counter-clockwise direction as the stop roller rides up onto a high part of the indexing cam, the pin gate latch release link 69 is pulled downwardly. As turret indexing continues, and the stop roller 83 rides down into another depression 81 on the indexing cam, the stop lever 84 pivots in a clockwise direction, forcing the pin gate latch release link 69 upwardly. This occurs at about the time that turret indexing is complete. As the link 69 moves upwardly, the notch 70 provided adjacent the upper end thereof engages the pin 71 provided on the pin gate latch 64, thereby to pivot the latch 64 upwardly, releasing the lower arm 57 of the pin gate so that a pin encountering the pin gate arm 55 is effective to pivot the pin gate, allowing passage of the pin to the turret. After the pin passes, the return spring 61 returns the pin gate to a pin blocking position where it is held by the latch 64.

It should be noted that the latch 64 is released from the release link 69 when the lower arm of the pin gate is pivoted in a clockwise direction as a pin passes over the pin gate, as the lower arm of the pin gate engages the latch release link 69 to pivot it in a counter-clockwise direction, disengaging the notch 70 thereon from the pin 71 on the latch 64. This allows the latch to fall to a latching position when the pin gate is spring returned to blocking position after the passage of a pin.

Turret indexing and pin travel on the cross conveyor are controlled in the fashion described above while pins are deposited in the nine outer pin receiving pockets on the turret. These pockets, as illustrated in FIGURE 2, are for the #9, #10, #6, #3, #1, #2, #4, #7 and #8 pin positions, and pins are delivered to the turret pockets in the order mentioned.

When the chute 35 is indexed to the pin receiving station, to receive a pin for the #5 position, the trip member 99 is not engaged by this pin, and other means are provided to effect indexing of the turret and operation of the pin gate 55. Such other means include the trip lever portion 47 projecting into the pin chute 35 and engageable by the tenth pin as it enters the chute. The latch and trip member 45 when engaged by a pin in the chute 35 initiates a series of operations which results in dropping the ten pins to the deck structure below after rotation of the spider relative to the turret pockets, followed by an indexing of the turret relative to the spider to reposition the parts for supporting pins, and actuation of the pin gate to permit the passage of the first pin in the next complement.

The latch and trip member 45 is controlled by a mechanism including links 110 (FIGURE 5) each having one end pivoted on the member 45 and the opposite end pivotally connected to a lever 111 pivoted as at 112 on the chute 35 and having a probe 113 engageable with a control member 114. The member 114 is provided for the purpose of preventing indexing of the spider relative to the turret to drop the pins in the event that the deck structure situated therebeneath is not suitably prepared for receiving the complement of pins from the turret. In the event that the desk structure is prepared to receive the pins from the turret, the control member is withdrawn from the position illustrated by means (not shown) so that the probe 113 and the latch member 45 are free to move when engaged by a pin in the chute 35.

As previously described, pivotal movement of member 45 when engaged by a pin in the chute 35, releases the latching portion of the member 45 from the turret-spider latch roller 44, the member 45 being carried on the turret, and the roller 44 being carried on the spider. This releases the spider from the turret for movement relative to the turret by a drive means which includes a lever 120 (FIGURE 6) pivoted on one frame arm 19 as at 121 and having a free end connected with a tension spring 122 having its opposite end suitably anchored on the other frame arm 19 (see FIGURE 6). The arm 120 carries a cam follower roller 123 engageable with the periphery of a cam 124 carried by the spider. The cam 124 is provided with a gradually rising peripheral cam surface 125 and at the end of such gradually rising surface a notch or recessed portion 126.

As the turret is indexed while the nine outer pockets are being filled with pins, the gradually rising surface on the cam 124 tensions the spring 122 by forcing the cam roller 123 and the lever 120 in a clockwise direction about the pivot 121. After the ninth pin is delivered to the final outer pin receiving pocket on the turret, and the turret indexes, the cam 124 is positioned so that the follower roller 123 is just entering the recessed portion 126 of the cam. Following this, when the tenth pin is dropped, tripping the latch 45 and releasing the spider from the turret, the tension in the spring 122 forces the roller into the depression 126, causing rotation of the spider relative to the turret to remove the support from the pins in the outer pin receiving pockets on the turret. All ten pins therefore drop to the deck structure below into their respective buckets 30-1 through 30-10, numbered in accordance with pin position, for delivery to the bowling surface.

In order to again position the turret in registry with the pin supporting spider arms or spoons 42, the turret is indexed relative to the spider after all ten pins have been dropped. This is effective by means best illustrated in FIGURE 7 including a gear 130 positioned beneath the turret drive pulley 79 and frictionally engaged therewith to turn therewith when free to do so but also adapted to be held against rotation. The gear 130 meshes with a gear 131 carrying a block 132 engaged by a latch 133 pivoted on the frame as at 134 and urged in a counter-clockwise direction by a torsion spring 135. The gear latch is normally maintained in a position engaging the block 132 to prevent rotation of the gears 130 and 131. It carries an arm 136 engageable by a trip arm 138 carried on the spider, so that when the spider is indexed relative to the turret, the arm 138 engages the arm 136 to release the latch 133, freeing the gears 130 and 131 for rotation.

Also carried on the gear 131 is a cam block 140 engageable with a roller 141 on an arm 142 depending from the trip member 99 normally engaged by the pins passing to the nine outer pin receiving pockets of the turret. When the cam block 140 engages the roller 141, the indexing trip lever 99 is pivoted to release the turret stop latch member 90, freeing the turret for indexing movement. During the indexing, the pin gate 55 is released in the manner previously described. Also during turret indexing, the spider is held against movement by virtue of the engagement of the cam roller 123 with the bottom of the recessed portion 126 on the spider cam 124. After the turret indexing is complete, the turret-spider latch roller 44 is again positioned for engagement with the latch 45 to thereby latch the turret and spider for movement together.

The mechanism as described above is conventional in the sense that it has been used commercialy. According to the present invention a control may be imposed on the mechanism described above for the purpose of preselectively designating only one or more pin positions less than ten at which it is desired that pins be set. Such a control enables the setting of a selected pin or a group of selected pins, rather than the entire complement of ten pins, for example, for the purpose of enabling a bowler to practice shots at selected pins.

Referring now especially to FIGURES 3, 4, 6 and 8, a pin gate and turret indexing control is provided in an embodiment of the present invention in the form of magnets or magnetic inserts indicated generally at 150. A plurality of inserts, one removably insertable in each of the nine recesses or depressions 81 of the indexing cam, may be provided for association with the turret indexing cam. The turret indexing cam is of a magnetizable material, e.g., a ferrous metal, and the inserts are magnetic and may be permanent magnets of ferrous metal composition. The inserts 150 are configured to fit within the recesses 81 between adjacent protrusions or ridges 145 for the purpose of diverting a cam follower or stop roller 83 from normal movement with respect to the annular indexing cam surface, causing the stop roller to track the top edge of the insert from one ridge 145 to the next without travelling into recess 81.

It can be seen that the cam surface of the annular indexing cam is a circular surface in plan view defined by alternate recesses and ridges in side view and that the surface within each recess is also arc-like or arcuately curvilinear. The inserts 150 are each provided with a surface configurated to conform in surface-to-surface contact with a portion of the annular cam surface, e.g. a portion of the cam surface between two adjacent ridges 145 and generally defining a recess 81. Thus, one edge 171 of each insert 150 is a curvilinear edge having a curvilinear surface of generally arc-like or arcuate configuration in bottom plan view. Interconnecting the ends 173 and 175 of the curvilinear or arcuate surface is a generally horizontal longitudinal tracking surface 172 which, when the inset is within recess 81, is generally parallel to the bottom of recess 81. The curvilinear surface extends in a curvilinear path away from the longitudinal edge 172 at one end, e.g. 173, thereof and thence extends in a generally horizontal longitudinal path generally parallel to the longitudinal edge 172 and then in a curvilinear path to the other end, e.g. 174, of longitudinal edge 172, with the curvilinear paths merging with the generally straight path. It is seen that the configuration of each insert provides surface-to-surface contact of curvilinear surface or edge 171 with the surface defining one of recesses 81. Each of magnetic inserts 151 has sufficient magnetic force to secure the magnet or insert in surface-to-surface contact within the recess even against urging of stop roller 83 passing over the longitudinal horizontal tracking surface 172.

The magnetic inserts 150 may be of the same or different configuration depending on the cam structure. Each of the inserts has a tracking edge or surface 172 with ends 173 and 175 merging with or continuing the tracking surface of one of ridges 145 to an adjacent ridge 145 and if one or more recesses 81 are of the same configuration the inserts are interchanegable, e.g. where all of recesses 81 are of the same size and shape, all of inserts 150 are also of the same size and shape and are interchangeable.

It is an advantage of the control means provided by the present invention that existing pinsetter apparatus can be readily and inexpensively adapted for selective setting of less than the normal complement of ten pins, e.g. for practice bowling. Accordingly, the combination of pins desired to be set up is selected and one or more of the magnetic inserts 150 are positioned within the recesses 81 in accordance with the pin positions which it is desired not to include in the setup, i.e. the non-selected pin positions. This is done by placing an insert in each recess where the stop roller 83 would normally fall to permit delivery of a pin to the respective turret receptacle with the receptacle indexed to the pin delivery station. Thus, as the turret indexes, the stop roller 83 falls only into recesses 81 which do not contain inserts 150. Each time stop roller 83 drops into a depression 81 lower arm 57 of the pin gate is released by latch 64 so that a pin encountering the pin gate arm 55 is effective to depress the arm and the pin passes to the turret and, each time the stop roller rides up on a projection 145, the pin gate latch release link is pulled downwardly to lock the pin gate until the stop roller 83 again rides down into another depressison 81 on the indexing cam, not filled with a magnetic insert 150. It is apparent that turret indexing and pin travel on the cross conveyor are accordingly controlled so that pins are deposited only in those of the nine outer pin receiving pockets on the turret which correspond to depressions or recesses having inserts excluded therefrom. Thus, pins are delivered solely to the preselected ones of the peripheral nine pockets corresponding to pin positions preselected for the desired setup.

When chute 35, is indexed to the pin receiving station to receive a pin for the #5 position, the pin is delivered to chute 35 and trips lever 47 as described above. In the illustrated embodiment, the tripping of lever 47 initiates the dropping of pins onto the deck structure and the setup of pins on the pin receiving surface of the bowling alley. Where the #5 pin position is one of the selected setup, no further adaptation or control is necessary. However, where it is desired to eliminate the #5 pin from the desired setup, by-pass means such as chute 160 is provided. Chute 160 is a removable chute positioned below the #5 or central pin receptacle of the indexing turret, i.e., chute 35, and is also positioned below the pin passage responsive means 47. Bucket 30–5 may be removed and chute 160 mounted in lieu thereof, e.g., using the same mountings as provided for bucket 30–5. Thus, a pin passing through chute 35 under normal indexing operation trips lever 47 to initiate the dropping of pins to the pin deck and is then diverted through chute 160 back to the bowling alley pit, permitting normal subsequent pinsetting operation triggered by normal passage of the #5 pin without including the #5 pin in the setup. Chute 160 may be releasably mounted in position by any means desired, e.g., by brackets 162 and 163 releasably bolted to the pinsetter frame as by bolts 164 and 165, as illustrated in FIGURE 3, and is preferably secured by quickly releasable means so that the pinsetter may be adapted or readapted for various combinations of pins with a minimum expenditure of time and effort for adaptation.

I claim:

1. A bowling pin handling apparatus for use in a pinsetter at the pit end of a bowling lane and comprising an indexable receiver having a plurality of pin receptacles arranged to move successively past a pin receiving station and adapted to deliver pins to said pin deck structure, pin delivery means for delivering pins to said receptacles in said indexable receiver for subsequent delivery to said pin deck structure, cam means having rises and falls and indexable with said receiver and including normally discernible deviations corresponding to each of the plurality of pin receptacles, means responsive to said cam means and the deviations controlling delivery of pins to said pin receptacles upon indexing of each of said receptacles to said pin receiving station, said cam means being of a magnetically permeable material, a plurality of magnetic cam inserts each having a bottom surface conforming with at least one fall in the cam surface adapting the insert for insertion between rises and each having a top surface generally flush with adjacent cam rises when inserted for causing said cam means to control indexing of said receiver past one of said pin receptacles corresponding to each fall bridged by said magnetic inserts, the attachment of said magnetic inserts to said cam means consisting of magnetic attraction rendering said magnetic inserts readily manually movably insertable for by-passing said deviations, a central pin receptacle in said indexable receiver, means responsive to passage of a pin through said central receptacle for initiating delivery of pins from said receiver, and chute means removably mounted on the pin deck structure and extending between said central receptacle and pin deck structure and beyond said pin passage responsive means for diverting a pin away from delivery to said pin deck structure and into the lane pit.

2. A pin handling apparatus comprising an indexable receiver having a plurality of pin receptacles including a generally central receptacle, means responsive to passage of a pin through the central receptacle for initiating delivery of pins from said receiver to a pin deck structure having a plurality of pin receiving positions including a central position, and removable chute means below said central receptacle and below said pin passage responsive means mounted between said pin passage responsive means and the central pin receiving position and shaped for diverting a pin delivered from said central receptacle away from the central pin receiving position of the deck.

3. A bowling pin handling apparatus comprising a pin deck structure having a central pin receiving position, an indexable receiver having a plurality of peripheral pin receptacles arranged to move successively past a pin receiving station and adapted to deliver pins to said pin deck structure, pin delivery means for delivering pins to said receptacles, an annular cam of magnetizable material including normally trackable alternating rises and falls, the falls being defined between pair of adjacent rises, one such fall and rise corresponding to each of said pin receptacles arranged to move successively past the pin receiving station, means responsive to each of said rises actuating delivery of a pin to one of said peripheral pin receptacles upon indexing of the receptacle to said pin receiving station, a plurality of magnetic cam inserts selectively insertable to fit and fill each of said falls, track surfaces on each of said inserts adapted to span a fall in said cam for causing said cam means to control indexing of said receiver past the pin receptacle corresponding to each fall containing one of said inserts, each of said magnetic inserts having sufficient magnetic force to secure the insert in the fall, a central pin receptacle in said indexable receiver, means responsive to passage of a pin through said central receptacle for initiating delivery of pins to said pin deck structure, and chute means removably positionable below said central receptacle, below said pin passage responsive means and above the central pin receiving position of the pin deck structure for diverting a pin from delivery to the central pin receiving position after passage of the pin through the central receptacle.

4. A bowling pin handling apparatus for use in a pinsetter at the pit end of a bowling lane, said apparatus comprising an indexable receiver having a plurality of pin receptacles including a central receptacle, a pin deck structure below said receiver and having a plurality of pin receiving positions including a central position for receiving a pin from the central receptacle, pin supply means in the lane pit, means for delivering pins one at a time from said supply means to receptacles in said receiver, means responsive to passage of the pin through the central receptacle for initiating delivery of pins from said receiver to the pin deck structure, and removably mounted chute means between the central receptacle and central pin receiver and beyond said initiating means for diverting a pin away from delivery to the central pin receiving position and into said pin supply means.

5. A bowling pin handling apparatus for use in a pinsetter at the pit end of a bowling lane, said apparatus comprising an indexable receiver having a plurality of pin receptacles, pin supply means in the lane pit, means for delivering pins one at a time from said supply means to each receptacle in said receiver, means for releasing pins from said receiver to a pin deck structure, a pin deck structure below said receiver and having a plurality of pin receiving positions including one position corresponding to each receptacle, chute means, and means mounting said chute means between one of said receptacles and the corresponding one of said receiving positions, said chute means being shaped for diverting a pin away from said one receiving position and into said pin supply means.

References Cited by the Examiner
UNITED STATES PATENTS

| | | | |
|---|---|---|---|
| 2,775,832 | 1/1957 | Vizza | 248—206 X |
| 2,967,708 | 1/1961 | Huck et al. | 273—43 |
| 2,995,983 | 8/1961 | Davis | 248—206 X |
| 3,004,761 | 10/1961 | Congelli et al. | 273—43 |
| 3,057,224 | 10/1962 | Svaty et al. | 74—568 |
| 3,149,838 | 9/1964 | Seidner | 273—43 |

DELBERT B. LOWE, Primary Examiner.